United States Patent [19]
Aoki et al.

[11] Patent Number: 5,781,403
[45] Date of Patent: Jul. 14, 1998

[54] ELECTRIC DOUBLE LAYER CAPACITOR HAVING HYDROPHOBIC POWDERY ACTIVATED CHARCOAL

[75] Inventors: Munekazu Aoki; Masako Inagawa; Keitaro Katsu, all of Tokyo, Japan

[73] Assignee: NEC Corporation, Tokyo, Japan

[21] Appl. No.: 903,428

[22] Filed: Jul. 30, 1997

[30] Foreign Application Priority Data

Jul. 30, 1909 [JP] Japan .................................. 7-200703

[51] Int. Cl.$^6$ .................................................... H01G 9/00
[52] U.S. Cl. ........................... 361/502; 361/512; 361/534
[58] Field of Search .......................... 361/502, 512, 361/523, 525, 528, 529, 530, 534, 503; 29/25.03, 623.1; 429/152, 192, 194, 191

[56] References Cited

U.S. PATENT DOCUMENTS

| | | | |
|---|---|---|---|
| 4,757,424 | 7/1988 | Morimoto et al. | 361/502 |
| 5,426,561 | 6/1995 | Yen et al. | 361/502 |
| 5,450,279 | 9/1995 | Yoshida et al. | 361/502 |
| 5,455,999 | 10/1995 | Weiss et al. | 29/623.1 |
| 5,568,353 | 10/1996 | Bai et al. | 361/523 |

FOREIGN PATENT DOCUMENTS

| | | |
|---|---|---|
| 60-263417 | 12/1985 | Japan . |
| 2-135719 | 5/1990 | Japan . |
| 2-251124 | 10/1990 | Japan . |
| 4-288361 | 10/1992 | Japan . |

*Primary Examiner*—Kristine L. Kincaid
*Assistant Examiner*—Anthony Dinkins
*Attorney, Agent, or Firm*—Young & Thompson

[57] ABSTRACT

An electric double layer capacitor including a pair of activated charcoal electrodes facing each other with the intermediary of a porous separator, and current collecting members each being positioned on a surface of the respective electrode opposite to a surface contacting the separator is disclosed. Hydrophobic powdery activated charcoal is provided around the electrodes for adsorbing gases. With this arrangement, it is possible to prevent pressure inside the capacitor from being elevated by gases produced in the capacitor, thereby enhancing the reliability of the capacitor.

3 Claims, 7 Drawing Sheets

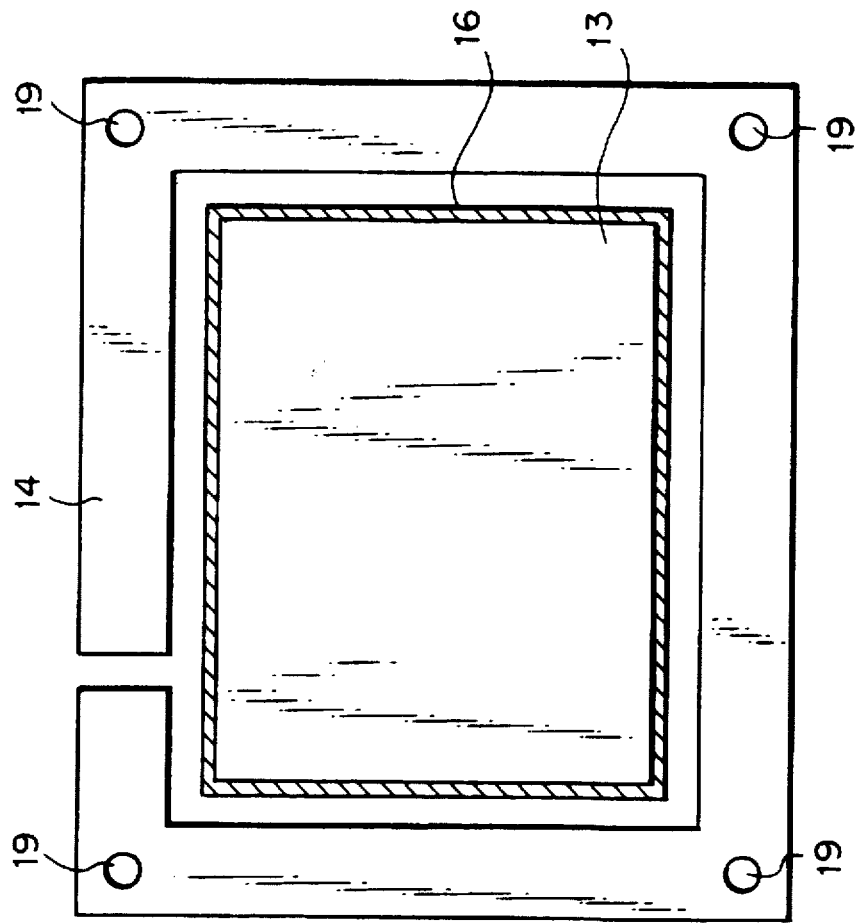
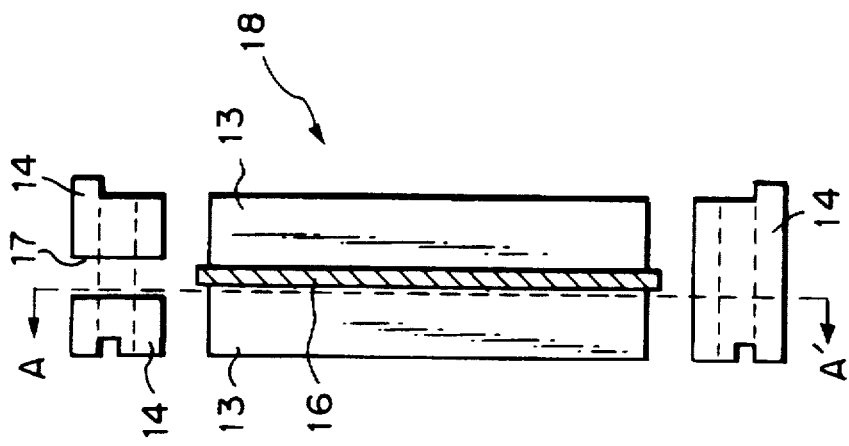

ELECTRIC DOUBLE LAYER CAPACITOR HAVING HYDROPHOBIC POWDERY ACTIVATED CHARCOAL

BACKGROUND OF THE INVENTION

The present invention relates to an electric double layer capacitor and, more particularly, to a stack type electric double layer capacitor having polarizing electrodes implemented by solid activated charcoal.

An electric double layer capacitor has a static capacity greater than one available with an aluminum electrolytic capacitor, and does not need a charge/discharge control circuit included in a secondary battery. With these advantages, this type of capacitor has customarily been used mainly to back up a memory included in an electronic apparatus or to start up a motor, actuator or similar mechanical part instantaneously at the time of power failure. For such an application, a pull-out current of several milliamperes to several hundred milliamperes has heretofore been used. Polarizing electrodes built in the capacitor are generally implemented as activated charcoal electrodes having a broad surface area, e.g., a paste of a mixture of powdery activated charcoal and electrolyte or activated charcoal fibers impregnated with an electrolyte. There has recently been proposed polarizing electrodes formed of an activated charcoal/polyacene composite, as taught in Japanese Patent Laid-Open Publication No. 4-288361. This composite is produced by causing a mixture of powder or fibers of activated charcoal and granular or powdery phenol resin to set by heat, and then heating it in a nonoxidizing atmosphere. An electric double layer capacitor with this kind of polarizing electrodes can be rapidly charged and discharged by a current of the order of several amperes to several thousand amperes.

The electric double layer capacitor having the above advantages may be combined with a secondary battery in a hybrid configuration in order to regenerate energy at the time of, e.g., the braking of a car, train, elevator or similar vehicle, as proposed in the past. In the hybrid configuration, the capacitor operates when power density is required, while the battery operates when energy density is required. This successfully enhances the total energy efficiency.

The conventional electric double layer capacitor has gaskets which are hermetically sealed. This brings about the following problem. Gases are produced by the application of an oxidation potential and a reduction potential to solid activated charcoal electrodes during operation. In addition, when the capacitor is used in a high temperature atmosphere, gases are also produced due to the elevation of the vapor pressure of an electrolyte. Such gases cannot be released from the sealed gaskets. This increases the internal resistance of the capacitor and thereby brings about various troubles.

In order to solve the above problem, Japanese Patent Laid-Open Publication Nos. 60-263417 proposes an electric double layer capacitor including a substance capable of adsorbing gases, particularly fluorocarbon gas, so as to adsorb gases produced in the capacitor. This document teaches that because fluorocarbon is a colorless, transparent liquid, it is mixed with an electrolyte. However, fluorocarbon mixed with the electrolyte or similar constituent of the capacitor is disadvantageous in that fluorocarbon lowers the ion conductivity of the electrolyte, and in that fluorocarbon or its component is adsorbed by the activated charcoal electrodes and obstructs the adsorption of the cation and anion of the electrolyte by the electrodes. The capacitor must have its electric characteristic, e.g., internal resistance and static capacity sacrificed although successfully slowing down the elevation of internal pressure.

Japanese Patent Laid-Open Publication No. 2-251124 also pertains to an electric double layer capacitor of the type having a unit cell in which polarizing electrodes are separated by a separator, and proposes to add a carbonic acid gas adsorbing agent to the electrodes. Specifically, the document teaches that the electrodes are formed mainly of carbon black, and that 1% to 30% of calcium oxide, beryllium oxide, strontium oxide, barium oxide or similar carbonic acid gas adsorbing agent and about 25% of teflon-based binder are added to the electrodes. However, the carbonic acid gas adsorbing agent and binder increase the specific resistance of the electrodes, and in addition lowers the static capacity of the electrodes for a unit volume.

Further, Japanese Patent Laid-Open Publication No. 2-135719 proposes to add a carbonic acid gas adsorbing agent to an organic electrolyte for use in an electric double layer capacitor and whose major component is propyrene carbonate. Specifically, this document teaches that the solvent of the electrolyte is implemented by propyrene carbonate while the solute of the electrolyte is implemented by tetraethyl ammonium tetrafluoride borate, and that the carbonic acid gas adsorbing agent is implemented by calcium oxide, magnesium oxide, beryllium oxide, strontium oxide, barium oxide or the like. This kind of scheme, however, has exactly the same problems as the scheme taught in Laid-Open Publication No. 60-263417.

The polarizing electrodes included in the electric double layer capacitor are formed of activated charcoal in order to have a broad surface area. For the production of activated charcoal, use is made of wood, sawdust, coconut husk, pulp waste or similar plant material or coal, petroleum heavy oil, petroleum pitch or similar fossil fuel. Such a raw material is carbonized at 600° C. to 800° C. and then invigorated by steam or similar gas or chemicals. As a result, activated charcoal having a desired specific surface area is attained. Because activated charcoal has its surface area increased by a chemical reaction during invigoration, its surface is covered with various kinds of functional groups and chemically active. Therefore, when an oxidation potential or a reduction potential is applied to the activated charcoal electrodes, some reaction gases are produced. It is known that major one of these reaction gases is carbon dioxide ascribable to the oxidation potential applied to the positive pole.

As for miniature electric double layer capacitors presently on the market and used to back up memories, each electrode has a volume which is only about 1/20 of the volume of an electrode included in a large capacity, electric double layer capacitor to which the present invention pertains. In addition, the bulk density of activated charcoal included in each miniature capacitor is 50% to 60% of the bulk density of activated charcoal included in the large capacity capacitor. Therefore, the absolute amount of the reaction gases ascribable to the oxidation potential and reduction potential is negligible with the miniature capacitors. However, the reaction gases are not negligible when it comes to the large capacity capacitor including activated carbon electrodes having a great volume and a great bulk density, and gaskets having a great volume.

SUMMARY OF THE INVENTION

It is therefore an object of the present invention to provide an electric double layer capacitor including hydrophobic powdery activated charcoal capable of selectively adsorbing reaction gases so as to slow down the elevation of pressure inside the capacitor.

In accordance with the present invention, in an electric double layer capacitor having a stack of unit cells, the unit cells each has a porous separator, a pair of activated charcoal electrodes facing each other with the intermediary of the porous separator, a pair of current collecting members each being positioned on a surface of the respective activated charcoal electrode opposite to a surface contacting the porous separator, and hydrophobic powdery activated charcoal for adsorbing gases and arranged around the activated charcoal electrodes.

BRIEF DESCRIPTION OF THE DRAWINGS

The above and other objects, features and advantages of the present invention will become apparent from the following detailed description taken with the accompanying drawings in which:

FIG. 1A is a section showing a unit cell included in a conventional large capacity, electric double layer capacitor;

FIG. 1B is a section along line A—A' of FIG. 1A;

DESCRIPTION OF THE PREFERRED EMBODIMENT

Figure 2:
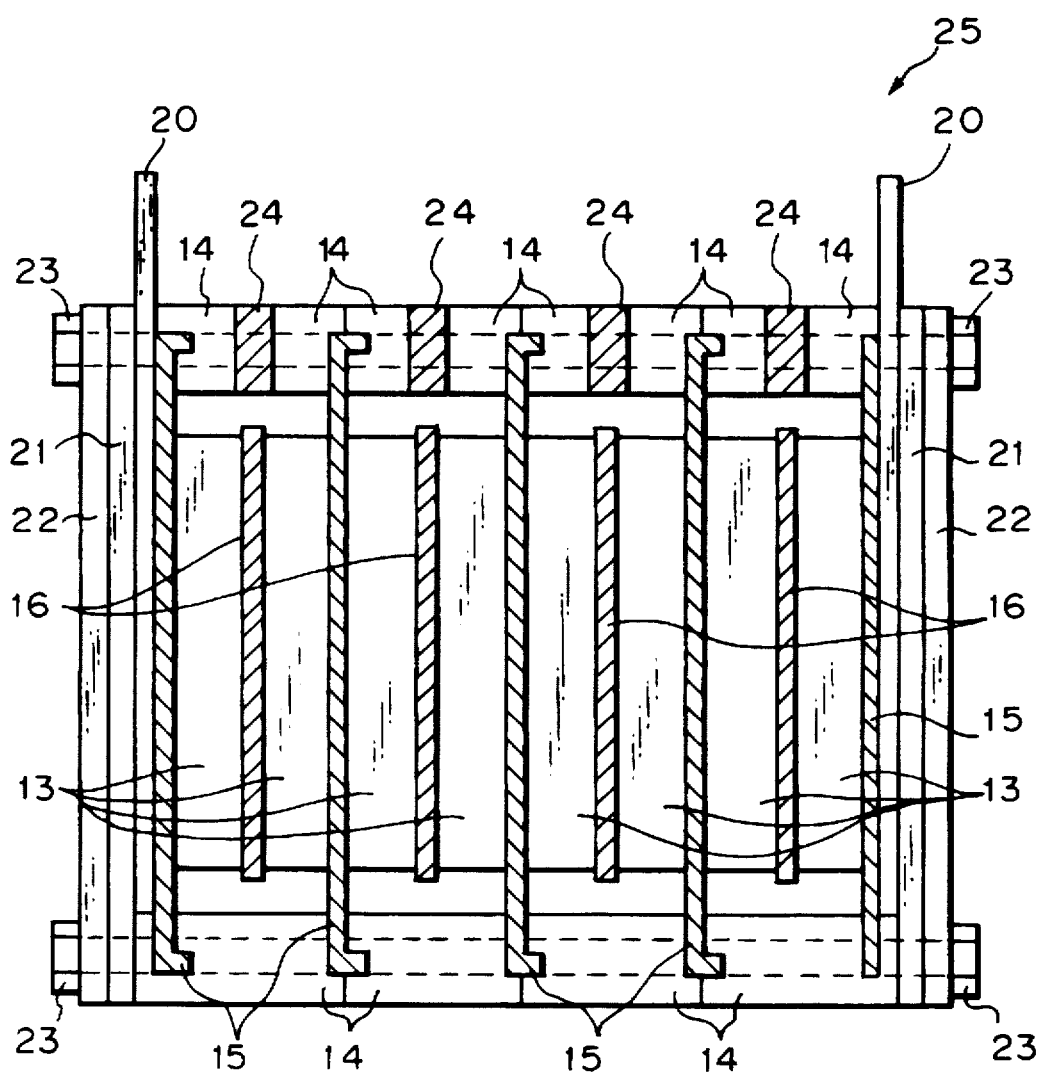
FIG. 2 is a section showing the conventional capacitor having a plurality of unit cells of FIG. 1A stacked together.
Figure 3:
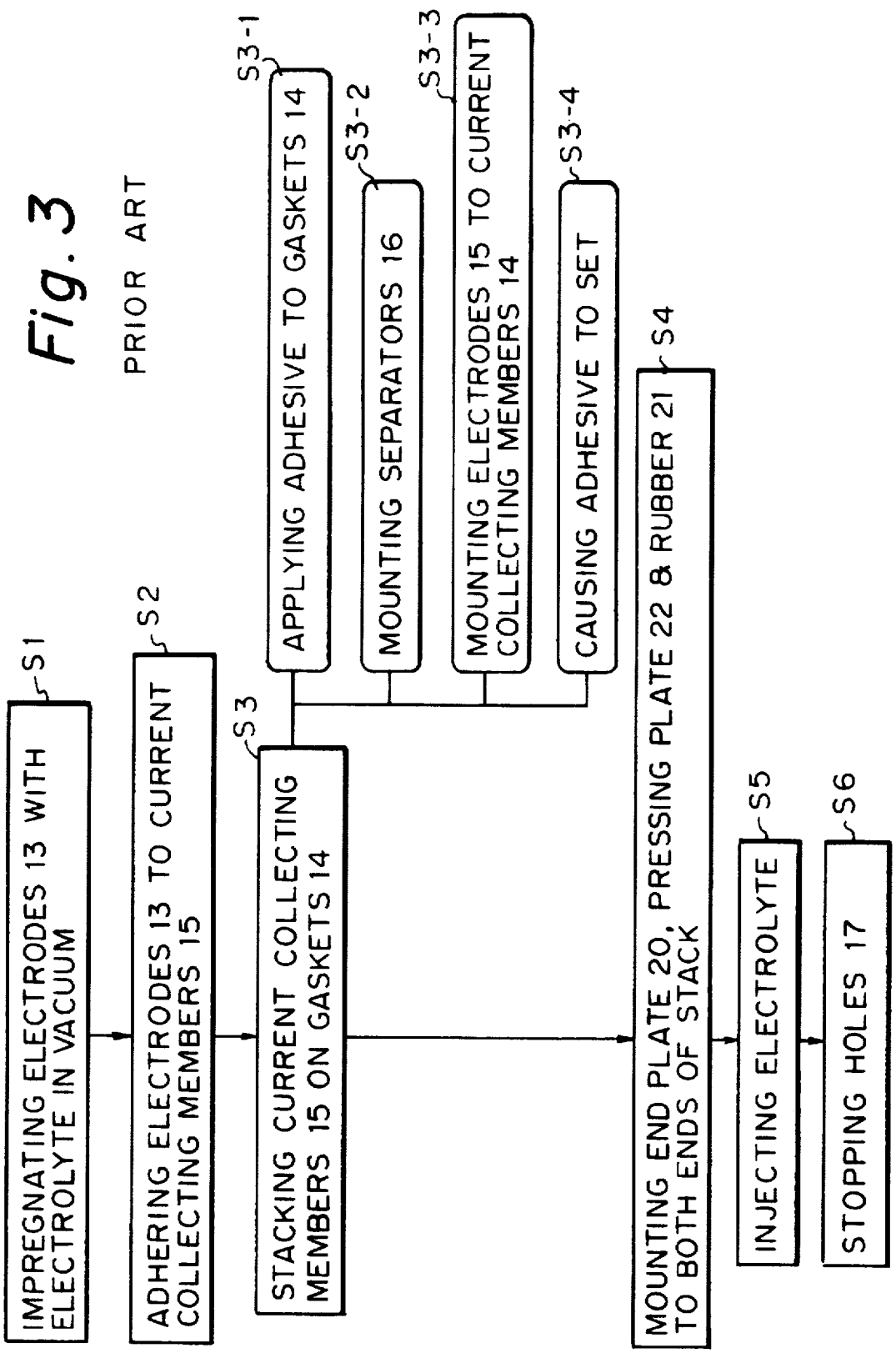
FIG. 3 is a flowchart demonstrating a procedure for producing the capacitor shown in FIG. 2.

To better understand the present invention, reference will first be made to FIGS. 1A, 1B, 2 and 3 for describing a conventional large capacity, electric double layer capacitor. To produce the electric double layer capacitor, generally designated by the reference numeral 25, solid activated charcoal electrodes 13 are impregnated with an electrolyte in vacuum (step S1, FIG. 3). Then, the electrodes 13 are respectively adhered to opposite sides of a current collecting member 15 implemented as a conductive rubber sheet (step S2). A desired number of current collecting members 15 each carrying the electrodes 13 thereon are stacked on gaskets 14 (step S3). A porous separator 16 is interposed between the nearby electrodes 13 and is ion conductive, but not electron conductive (step S3-2). The gaskets 14 are affixed to each other by adhesive (step S3-1). After the adhesive has set (step S3-4), a terminal plate 20, a rubber sheet or spacer 21 and a pressing plate 22 are positioned at each of opposite end s of the stack of the gaskets 14, as shown in FIG. 2, and then fastened by bolts 23 inserted into holes 19, as shown in FIG. 1B (step S4). Subsequently, an electrolyte is filled in the gaskets 14 via holes 17 shown in FIG. 1A (step S5). Finally, the holes 17 are stopped by plugs 24 (step S6) with the result that the gaskets 14 are hermetically sealed.

The above conventional capacitor with the hermetically sealed gaskets 14 has the following problem. Gases are produced by the application of an oxidation potential and a reduction potential to the solid activated charcoal electrodes 13 during operation. In addition, when the capacitor is used in a high temperature atmosphere, gases are also produced due to the elevation of the vapor pressure of the electrolyte. Such gases cannot be released from the sealed gaskets 14. This increases the internal resistance of the capacitor and thereby brings about various troubles. While Japanese Patent Laid-Open Publication Nos. 60-263417, 2-251124 and 2135719, for example, propose some different solutions to the above problem, they still have some problems left unsolved.

Figure 4B:
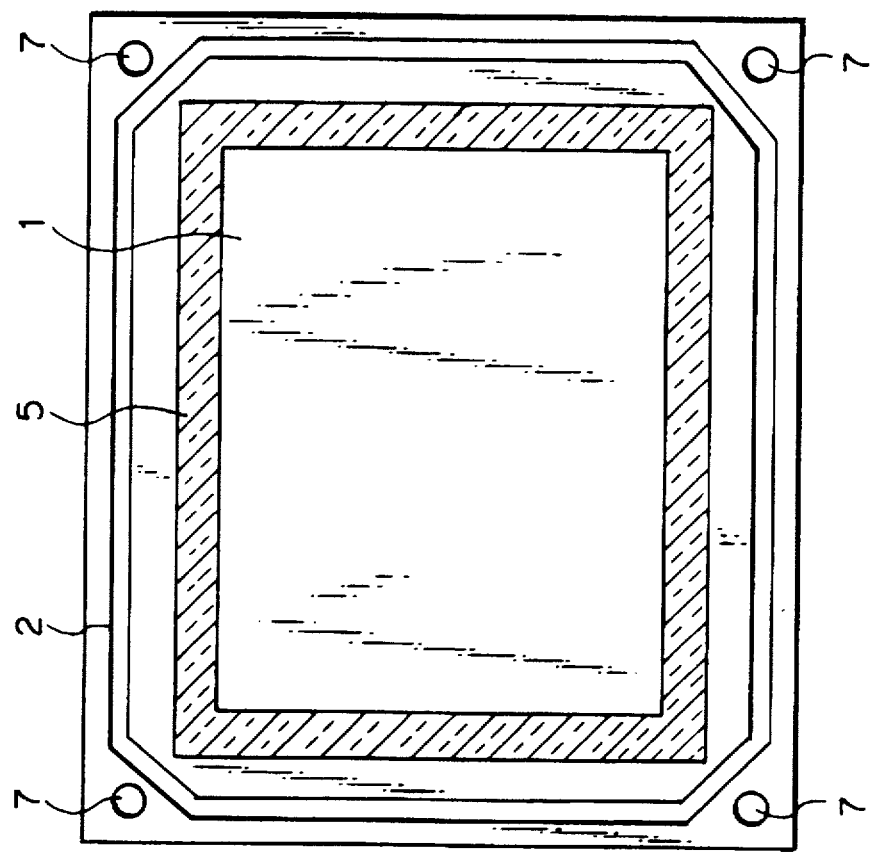
FIG. 4B is a side elevation of the unit cell of FIG. 4A, as seen from the left.
Figure 4A:
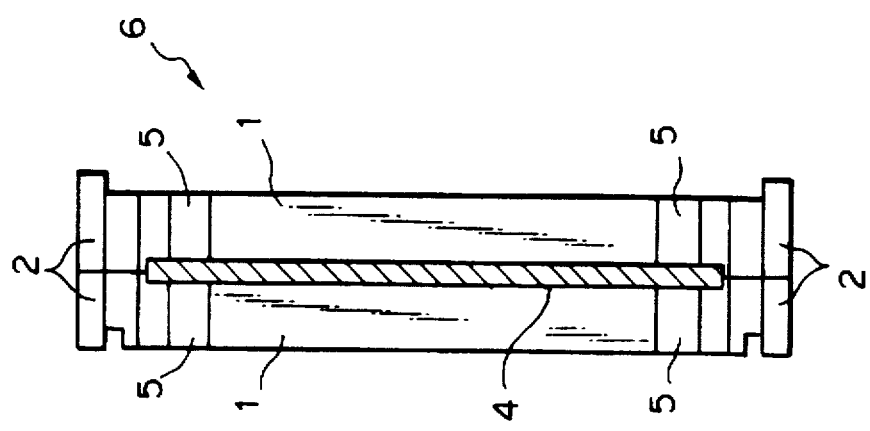
FIG. 4A is a section showing a unit cell included in a large capacity, electric double layer capacitor embodying the present invention.
Figure 5:
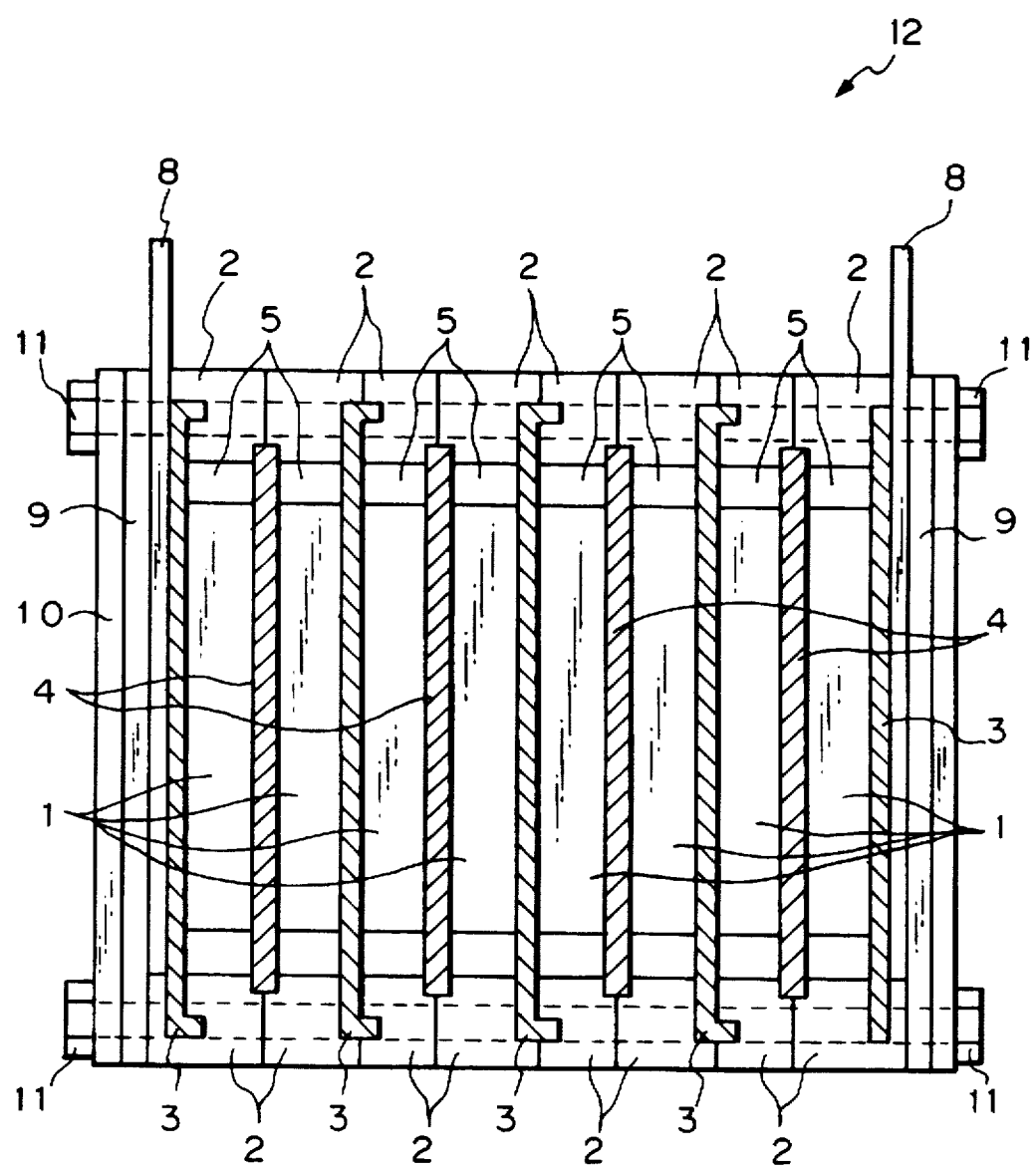
FIG. 5 is a section of the capacitor having a stack of unit cells each having the configuration shown in FIG. 4A.
Figure 6:
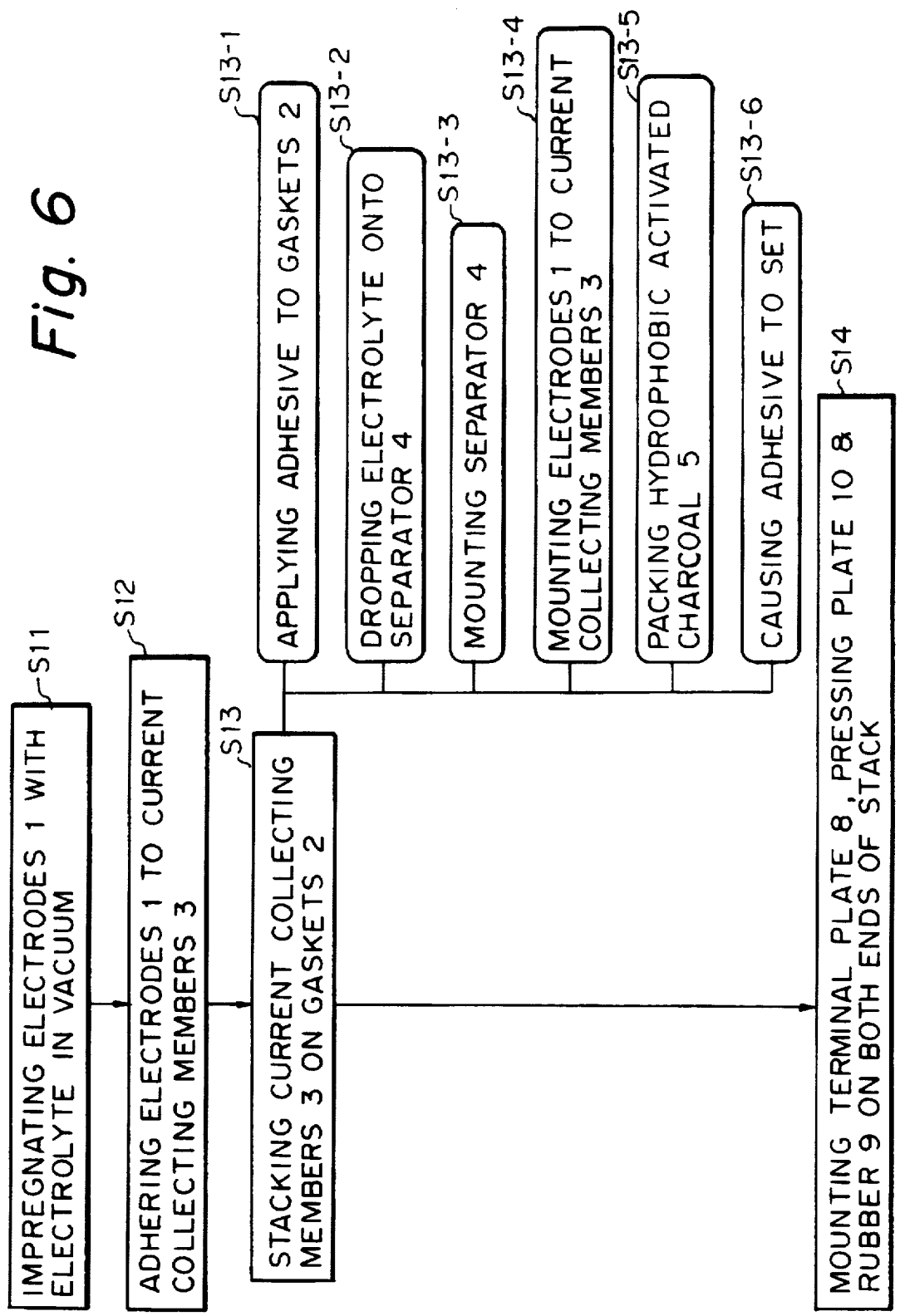
FIG. 6 is a flowchart representative of a procedure for producing the capacitor shown in FIG. 5.

Referring to FIGS. 4A, 4B, 5 and 6, a large capacity, electric double layer capacitor embodying the present invention is shown and generally designated by the reference numeral 12. FIGS. 4A and 4B show a unit cell or unit capacitor 6 included in the capacitor 12. FIG. 5 shows the capacitor 12 having a plurality of unit cells 6 stacked with the intermediary of current collecting members 3 implemented as conductive rubber sheets. FIG. 6 demonstrates a procedure for producing the capacitor 12.

The unit cell 6 includes solid activated charcoal electrodes 1. In the illustrative embodiment, the electrodes 1 are formed of an activated charcoal/polyacen composite taught in Japanese Patent Laid-Open Publication No. 4-288361. The electrodes 1 may contain any kind of binder and may be produced by any desired method so long as they are blocks of activated charcoal produced by baking a mixture of powdery activated charcoal and phenol resin or similar binder.

Gaskets 2 are formed of plastics or similar insulator. In the embodiment, the gaskets 2 are formed of heat-resistant ABS (acrylonitrile-butadien-styrene) resin. However, the gaskets 2 may be formed of any desired material so long as they are insulating and resistive to sulfuric acid and heat. The current collecting members 3 are formed of butyl rubber with carbon powder or similar powder kneaded therein. Porous separators 4 are implemented by glass fiber separators for use in a lead storage battery. The material of the separators 4 is open to choice so long as it is electrically nonconductive and permeable to ions.

To produce the capacitor 12, the electrodes 1 are impregnated with an electrolyte, i.e., dilute sulfuric acid beforehand (step S11). After the current collecting members 3 have been adhered to the electrodes 1, the electrodes 1 are stacked on the gaskets 2 (step S13). At this instant, adhesive is applied to the gaskets 2 (step S13-1). The porous separator 4 is impregnated with the electrolyte in an amount necessary for the unit cell 6 (step S13-2). The electrodes 1 are so arranged as to face each other with the intermediary of the separator 4 (step S13-3).

Subsequently, the gaskets 2 and current collecting members 3 are arranged around the electrodes 1 and separator 4 (step S13-4). Gaps formed between the electrodes 1 and the gaskets 2 are filled with hydrophobic activated charcoal 5 capable of adsorbing gases, i.e., so-called molecular sieving carbon (step S13-5). The activated charcoal 5 has pore diameters centering around 5 Å to 10 Å, as measured by a molecular probe method. The adhesive sets (step 13-6), completing the unit cell 6.

In the illustrative embodiment, the electrolyte is implemented by 30 wt % of dilute sulfuric acid, so that the individual unit cell 6 withstands a voltage of about 1.2 V, i.e., an electrolytic voltage. As shown in FIG. 5, a desired number of unit cells 6 shown in FIG. 4A are serially stacked with an end plate 8, a rubber sheet or spacer 19 and a pressing plate 10 positioned at each of opposite ends of the stack (step S14). Bolts 11 are inserted into holes 7 in order to press such a stack, completing the capacitor 12.

For comparison, a large capacity, electric double layer capacitor with molecular sieving carbon sealed therein and a large capacity, electric double layer capacitor lacking it were actually produced and subjected to +70° C., 0.8 V/cell durability tests. The tests showed that the EST (Equivalent Series Resistance) of the capacitor with the above carbon varies by +200% in a period of time about five times as long as the period of time in which the EST of the capacitor without the carbon varies by +200%.

Other experimental large capacity, electric double layer capacitors were produced which included solid activated charcoal whose mean pore diameter ranged from 3 Å to 1,000 Å, as measured by the molecular probe method adapted for the molecular sieving carbon. In this case, the conditions for producing molecule sieving carbon were adjusted such that the pore size concentrates around the mean pore diameter. It should be noted, however, that reducing the standard deviation of the pore diameter distribution below a certain value was impractical due to the characteristic of activated charcoal or the principle of measurement. In this respect, specific values to be presented hereinafter are only for reference.

Figure 7:
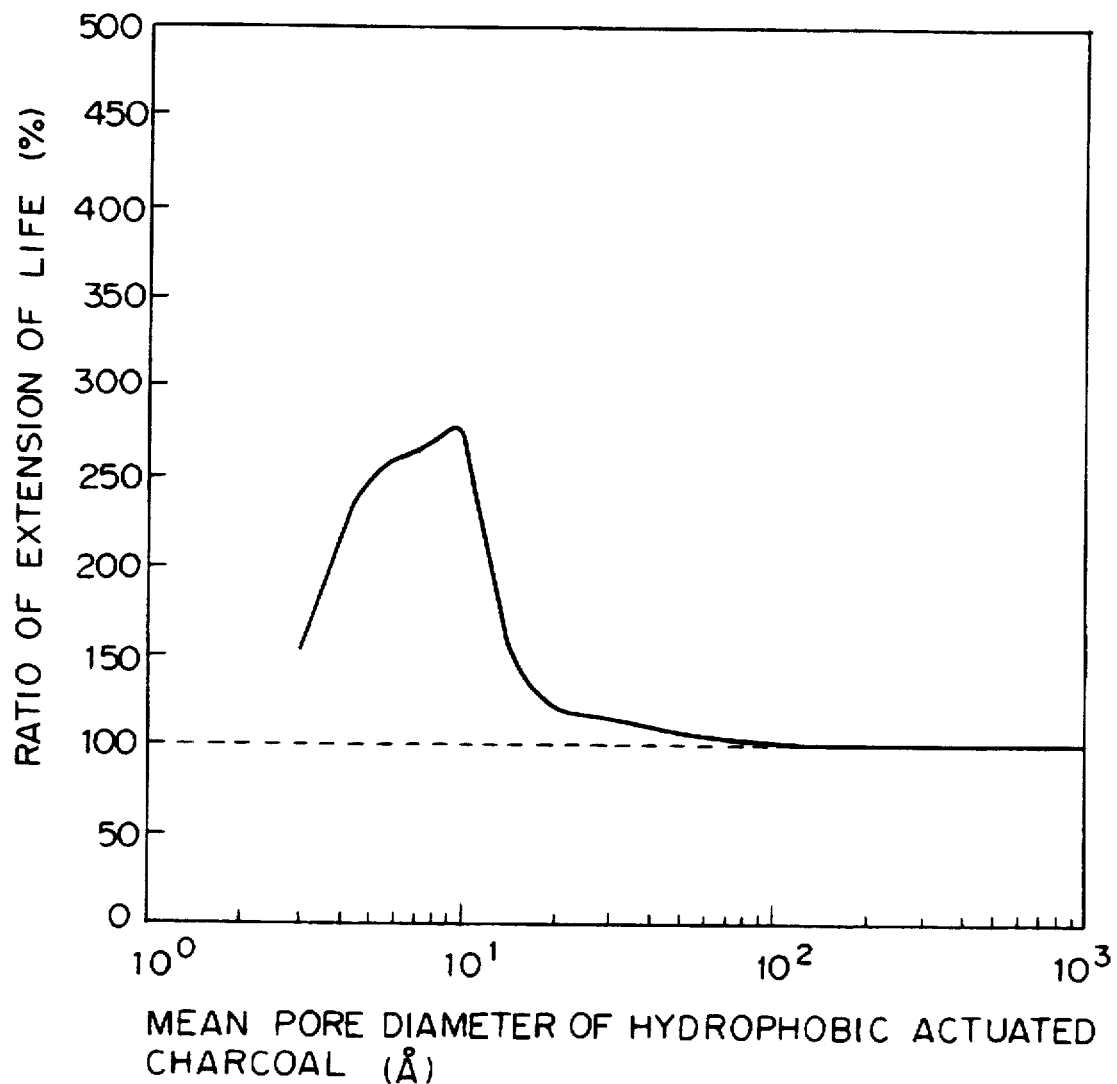
FIG. 7 is a graph showing a relation between the mean pore diameter of gas adsorbing hydrophobic activated charcoal used in a large capacity, electric double layer capacitor for comparison and the ratio of extension of a life.

The above capacitors with the molecular sieving carbon were subjected to +70° C., 0.8 V/cell durability tests in order to determine the ratio of extension of their life. For the test, a period of time in which an ESR ten times as great as the initial ESR was reached was determined to be the end of the life, and the life of the conventional capacitor was assumed to be 100. FIG. 7 shows the result of the tests; the ordinate and abscissa respectively indicate the mean pore diameter of the carbon and the extension of the life of the capacitor. As FIG. 7 indicates, more than 70% of the pores of the molecular sieving carbon optimal for adsorbing gases output from the solid activated charcoal should preferably has a mean pore diameter of less than 10 Å, more preferably between 5 Å and 10 Å.

In summary, it will be seen that the present invention provides an electric double layer capacitor having various unprecedented advantages, as enumerated below.

(1) Reaction gases produced on the application of an oxidation potential or a reduction potential to solid activated charcoal electrodes are adsorbed by hydrophobic powdery activated charcoal or molecular sieving carbon. This successfully slows down pressure elevation in gaskets and thereby extends the life of the capacitor. This is because the molecular sieving carbon having pore diameters concentrating around 5 Å to 10 Å fills gaps between the electrodes and the gaskets.

(2) The capacitor achieves the gas adsorbing ability without having its electric characteristic sacrificed.

(3) The hydrophobic powdery activated charcoal should only function to adsorb gases. This is because the above particular range of pore diameters allows carbon dioxide, which is the major gas output from the positive pole, to be selectively adsorbed. In addition, the injection of an electrolyte into the gaskets is not effected after the adhesion of the gaskets. In accordance with the present invention, a separator is impregnated with an electrolyte in an amount necessary for a single unit cell beforehand, and then the gaskets are adhered.

Various modifications will become possible for those skilled in the art after receiving the teachings of the present disclosure without departing from the scope thereof.

What is claimed is:

1. In an electric double layer capacitor having a stack of unit cells, said unit cells each comprising:

a porous separator;

a pair of activated charcoal electrodes facing each other with the intermediary of said porous separator;

a pair of current collecting members each being positioned on a surface of one of the activated charcoal electrodes opposite to a surface contacting said porous separator; and hydrophobic powdery activated charcoal for adsorbing gases and arranged around said activated charcoal electrodes.

2. A capacitor as claimed in claim 1, wherein more than 70% of pores of said hydrophobic powdery activated charcoal have diameters ranging from 5 Å to 10 Å.

3. A capacitor as claimed in claim 1, wherein said porous separator is impregnated with an electrolyte.

* * * * *

UNITED STATES PATENT AND TRADEMARK OFFICE
CERTIFICATE OF CORRECTION

PATENT NO. : 5,781,403
DATED : July 14, 1998
INVENTOR(S) : Munekazu AOKI et al.

It is certified that error appears in the above-indentified patent and that said Letters Patent is hereby corrected as shown below:

On the title page, in the Foreign Application Priority Data, Item [30], change "1909" to --1996--.

Signed and Sealed this

Twenty-second Day of September, 1998

Attest:

BRUCE LEHMAN

*Attesting Officer*              *Commissioner of Patents and Trademarks*

UNITED STATES PATENT AND TRADEMARK OFFICE
CERTIFICATE OF CORRECTION

PATENT NO. : 5,781,403
DATED : July 14, 1998
INVENTOR(S) : Munekazu AOKI et al.

It is certified that error appears in the above-indentified patent and that said Letters Patent is hereby corrected as shown below:

On the title page, in the Foreign Application Priority Data, Item [30], change "7-200703" to --8-200703--.

Signed and Sealed this

Twenty-fourth Day of November,1998

Attest:

BRUCE LEHMAN

*Attesting Officer*     *Commissioner of Patents and Trademarks*